May 16, 1961     J. VOLLMER     2,984,148
MEASURING APPARATUS
Filed Nov. 13, 1958
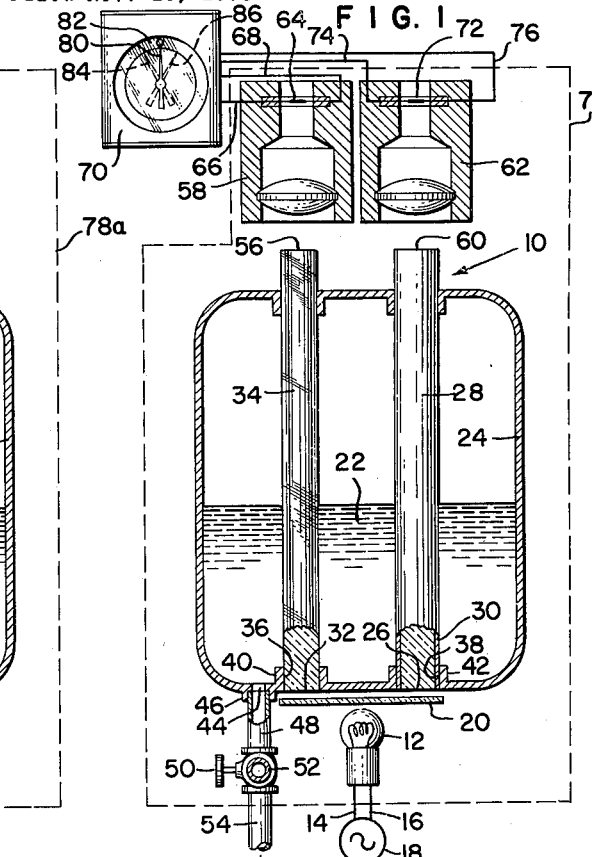
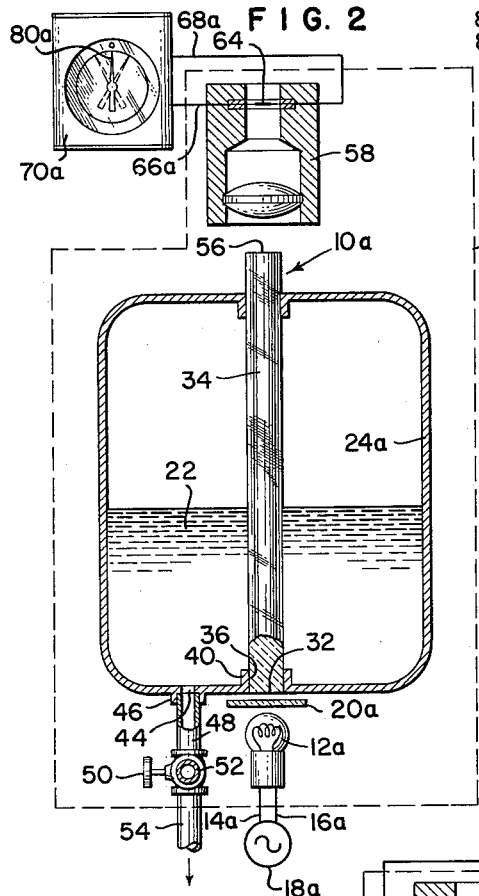
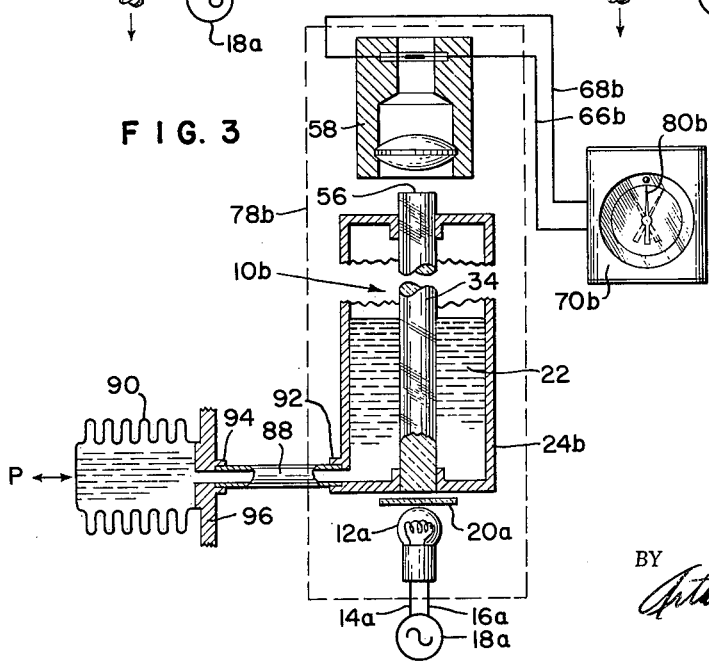
INVENTOR.
JAMES VOLLMER
BY Arthur H. Swanson
ATTORNEY.

United States Patent Office 2,984,148
Patented May 16, 1961

2,984,148

MEASURING APPARATUS

James Vollmer, Philadelphia, Pa., assignor to Minneapolis-Honeywell Regulator Company, Minneapolis, Minn., a corporation of Delaware Filed Nov. 13, 1958, Ser. No. 773,703

12 Claims. (Cl. 88—14)

This application relates to a radiant energy measuring apparatus for making a liquid level and pressure measurement.

More specifically, the apparatus disclosed in this application is based on the discovery that when radiant energy, in the form of light is applied and passes through one end of a radiant energy transmitting guide that has a peripheral portion thereof in contact with a column of liquid then a predeterminable amount of light will exit from the opposite end of this guide. If the height of the column of liquid that is in contact with the peripheral surface of the guide is then either increased or decreased a proportional change in the quantity of light that will exit from the end of this guide will occur. Furthermore, the predeterminable amount of applied light that will exit from the guide also will depend on the extent to which the spectrum of electro-magnetic waves of this applied radiant energy will be absorbed by the liquid or in other words will depend on the absorption characteristics that is inherent in the liquid.

It is therefore an object of the present invention to provide the aforementioned type of light guide with a filter which is made of the liquid whose level is to be measured, or of an equivalent filter material, so as to eliminate certain bands of energy from being transmitted into the light guide which energy would be abnormally absorbed by the liquid in very large quantities as compared to the other bands of energy which are being transmitted into the guide which have medium or weak absorption characteristics.

It is a specific object of the present invention to provide a light transmitting guide wherein the light that will be permitted to completely pass through the guide will depend on the amount of the light that is transmitted by way of perfect internal reflection taking place within the guide less the amount of light that will be absorbed into the liquid whose level is to be measured, by refraction due to its particular predetermined fixed index of refraction and/or its absorption characteristics.

Still another specific object of the invention is to provide a guide of the aforementioned type by which the amount of light passing through and out of the end of same can be compared with the amount of light passing through and out of a reference guide so as to give an indication of the level of a fluid permitted to come in contact with the outer surface of the first mentioned guide.

Still another more specific object of the invention is to provide a double guide arrangement of the type noted supra in which an electric light ratio indicating meter which is used to compare the amount of light passing through the guides is so arranged that it will be unaffected by any drop or increase in intensity of the light that is being emitted from the radiant light source or any heat that may be possessed by the liquid whose level is to be measured.

Still another object of the present invention is to provide a modified form of the aforementioned measuring apparatus in which a constant source of radiation is used to transmit light to and through a single light guide to a light indicating meter so that the level of a column of liquid that is surrounding such a single guide may be measured by the meter.

Another object of the present invention is to provide a third modified form of the aforementioned apparatus wherein the pressure of the fluid signal to be measured is used to change the level of a column of liquid surrounding a guide that is transmitting energy between one location and another so that the index of refraction and the absorption characteristics of this guide, and hence the amount of energy the guide is able to transmit, will be changed in accordance with changes occurring in the magnitude of the pressure of this fluid signal.

In the drawings:

Fig. 1 shows one embodiment of the present invention;
Fig. 2 shows another embodiment of the present invention and Fig. 3 shows still another modified form of the present invention.

In Fig. 1 of the drawing there is shown a liquid level measuring apparatus which is generally designated as reference numeral 10. This apparatus comprises an electromagnetic energy source which is schematically indicated as a light source 12 which derives its electrical energy by way of the conductor 14, 16 from a power source 18.

Directly in front of the light source 12 there is shown a filter 20 which is made from either a sample of the type of liquid 22 that is in the tank 24 whose level is to be measured or may be made of any equivalent filter material. This filter 20 is shown covering one end 26 of a reference or radiant energy transmitting guide 28 through the inner portion of which the light from the light source 12 is directed.

Experimentation has shown that if the level of the liquid 22 within the tank 24, 24a or 24b is not permitted to drop below a preset low level, which is for example, a few inches from the bottom of the tank, then, substantially all the bands of radiant energy passing through the guide which the liquid would absorb in abnormally large quantities would be refracted out of the guide and absorbed by the liquid between the time it enters the guide up until the time this present low level position is reached. Although the tank 24 is shown as an enclosed container in the drawing, it should be understood that tanks having open tops may be used to equal advantage.

Hence, it can be seen that the aforementioned liquid in the tank below this preset low level position acts as a filter if the level of the fluid is not allowed to drop below this low level. If such a low level arrangement is used then the external filter 20, 20a referred to supra will not be necessary.

This guide 28 has a coating 30 on its outer peripheral surface which is sensitive to the heat of the liquid 22 but which will prevent radiant energy from the light source 12 from being refracted out of the side walls of this guide. This coating 30 is made of silver or some other equivalent light restricting temperature sensitive material. The filter 20 also covers the end 32 of another radiant energy transmitting guide 34.

Although each of these radiant energy transmitting guides 28, 34 are preferably of a rod-shaped configuration and are made of a transparent material such as sapphire, it should be understood that guides which are made of quartz, of acrylin resin, or of methyl methacrylate plastic materials of a thermo plastic type such as, for example, commercial Plexiglas or Lucite may also be used.

The lower ends 26, 32 of these guides 28, 34 are shown respectively retained in a fixed sealed position in apertures 36, 38 formed by the walls of the cylindrically embossed portions 40, 42 of the tank 24.

The bottom of the tank 24 also contains a third aperture 44 and an embossed apertured portion 46 into the inner wall of which the upper end of a conduit 48 is fixedly connected. Connected to the lower end of this conduit 48 there is shown a three way valve 50. This valve 50 is shown arranged to connect the interior of the tank 24 by way of conduit 48 with either a flow of fluid under pressure passing through an inlet conduit 52 or with a conduit 54 that is useful in draining the liquid 22 from the tank 24 in the direction of the arrow.

An opposite end 56 of the guide 34 is directly under and spaced slightly below the thermopile 58 and the end 60 of the guide 28 is shown located in the similar manner with respect to the thermopile 62. Specifically each of the thermopiles illustrated in Fig. 1 is basically a thermopile of the type which is disclosed and claimed in the Harrison et al. Patent No. 2,357,193 and which is in extensive commercial use in the radiation pyrometers manufactured and sold by applicant's assignee. The light sensing element 64 of the thermopile 58 is connected by way of conductors 66, 68 to a meter 70 and a light sensing element 72 of the thermopile 62 is shown connected by way of conductors 74, 76 to the meter 70.

Fig. 1 of the drawing schematically shows an enclosure 78 entirely encompassing most of the component parts so far described so that strayed or any foreign matter from any external source will be prevented from coming in contact with, for example, any unprotected peripheral wall portion of either the radiant energy transmitting guide 34 or the guide 28.

The meter 70 that is shown in Fig. 1 of the drawing is used to compare the ratio of the signals being put out by thermopiles 58 and 62. The output leads 66, 68, 74, 76 of these thermopiles are connected in an identical manner as that disclosed in my copending patent application Serial No. 753,570 filed by Vollmer et al. and which is assigned to the same assignee.

If the intensity of the source of power 18 being supplied to the radiant energy source 12 should for any reason be caused to decrease or increase, the density of this light source would be normally varied. However, through the use of the light measuring meter referred to supra, the value of the E.M.F. output signal of each of these sensing elements 64, 72 of the thermopile 58, 62 will each likewise increase or decrease upon the occurrence of an increase or decrease in the intensity of the light source 12. From the aforementioned description it can thus be seen that since the effect of an increase or decrease in the intensity of the light source 12 will merely cause the simultaneous raising or lowering of the E.M.F. signal of each of the thermopiles by an equal factor such a ratio value that exists between the two E.M.F.'s that are fed into the meter 70 by means of the conductors 66, 68, 76, and 74 will not be effected by such a light intensity change. However, it should be understood that if a change occurs in the index of refraction and/or absorption characteristics due to a rise or fall of the liquid in the tank 24 it will cause the output E.M.F. signal from the sensing element 64 of the thermopile 58 to change with respect to the output E.M.F. signal being produced by the sensing element 72 of the thermopile 62.

The pointer 80 will be moved along the scale 82 to, for example, either of the dotted line positions 84, or 86 depending on whether the radiant energy loss was greater or less than the radiant energy loss that was present when the pointer of the meter 70 was in its initial balance, zero or minimum level position. Regardless of which of the dotted line positions 84, 86 the pointer 80 is positioned, that position will represent the E.M.F. ratio that is then present between the thermopile sensing element 64 of the thermopile 58 and the sensing element 72 of the thermopile 62.

Since this E.M.F. ratio is directly proportional to the light that is lost due to a change in the effective index of refraction and/or absorption characteristic of the liquid 22 and the guide 34 combination, the change in the solid line, zero or null position of the pointer 80 to either of the dotted line positions shown will indicate the extent to which the loss in radiant energy passing through the guide has increased or decreased from a preselected null or zero pointer minimum level position. Such a light loss, increase, or decrease represents a change in the aforementioned index and/or the absorption characteristics that are taking place due to the rise or fall of the liquid column 22 in the tank 24.

Since, as previously mentioned in the early part of the specification, this index of refraction and absorption loss can be used to measure liquid level changes the dotted line position 84, 86 of the pointer 80 on scale 82 can be calibrated so that they indicate accurately these latter mentioned values.

Fig. 2 of the drawing shows a modified form of the liquid level measuring apparatus 10a from that which is disclosed in Fig. 1. The parts identified by reference numerals 22—64 as shown in Fig. 2 are identical to the parts having these same reference numerals that are shown in Fig. 1.

Fig. 2 also shows an enclosure 78a which is smaller than the enclosure 78 as shown in Fig. 1 but which is used for the same light and dust restricting purposes as that already discussed by the latter mentioned enclosure.

The radiant energy generating source in Fig. 2 is shown as including an emitter 12a connected by way of conductors 14a, 16a to a constant power supply 18a. This particular radiant energy source is arranged to provide a radiant energy at unvarying intensity rather than one which often varies in intensity as is the case with the radiant energy source 12 shown in Fig. 1. Hence, no reference guide such as guide 28 that is in Fig. 1 arrangement is necessary when using the light source 9 of constant intensity shown in Fig. 2.

When a change in the aforementioned index of refraction and/or absorption characteristics occurs because of the fluid 22 passing into or out of the tank 24a shown in Fig. 2 due to the turning of the valve 50 to either an inlet or drain position, the output E.M.F. which the sensing element 64 of the thermopile 58 will produce across the lines 66a, 68a, will be similar to the type of E.M.F. change that was produced by the sensing element 64 of the thermopile 58 which has previously been described in the description of Fig. 1.

The meter 70a is of a null balanced type such as that which is disclosed in the Wills Patent 2,423,540 filed December 1, 1941, issued July 8, 1947. With this Fig. 2 arrangement, a change in the liquid level of the fluid in tank 24a may be noted by observing the degree to which the pointer 80a has been moved to the right or left of its solid line, zero or null position. In this way an observer of such an instrument 70a may be able to see whether the loss of light sensed by the sensing element 64 is decreasing or increasing from the aforementioned predetermined null or zero position so that he can determine from such a reading the extent to which the liquid 22 in the tank 24a has risen or fallen from any selected position such as a selected minimum level position.

From the aforementioned description of liquid level indication apparatus shown in Figs. 1 and 2 it can be seen that each form is useful in measuring the height of a column liquid by measuring the index of refraction and/or absorption characteristic of this liquid and guide combination and that such a measurement can be used to measure the degree to which the height of this column of liquid either increases or decreases from a pre-established level.

Fig. 3 which shows another modified form of the aforementioned described type of apparatus contains substanitally identical elements and reference numerals as those shown for the transmitting guide arrangement of Fig. 2. However, in Fig. 3 arrangement a predetermined amount of the liquid 22 is placed into the tank 24b to fill the interior of the conduit 88 and the bellows 90. The right end of this conduit 88 is fixedly connected in any suitable manner, such as by welding material, to an embossed sleeve portion 92 formed in the bottom of the tank 24b. The left end of this conduit 88 is similarly connected to an embossed sleeve portion 94 of a stationary wall 96. This stationary member 96 can be, for example, the wall of a chamber in which the magnitude of a fluid pressure P contained therein is permitted to apply the effect of its pressure against the bellows 90.

It can thus be seen from the aforementioned description that during the time the pressure P being applied to the bellows 90 is being increased or decreased the bellows 90 will be caused to move away from a predetermined compressed or null position and hence cause a corresponding increase or decrease in the level of the liquid 22 that is in the tank 24b.

The pointer 80b of the meter 70b will thus be caused to move in a clockwise direction away from its zero, null or twelve o'clock null position to the dotted line position such as that shown in Fig. 3 that is to the right of this twelve o'clock position whenever the pressure P being applied to the bellows 90 is increased.

In a similar but opposite manner the pointer 80b of the meter 70a will thus be moved in a counterclockwise direction away from its zero, null or twelve o'clock position to the dotted line position shown to the left of the twelve o'clock position whenever the pressure P being applied to the bellows 90 is decreased.

It should be pointed out that the double radiant energy transmitting guide rod arrangement which has been previously described for the form of the invention disclosed in Fig. 1 could be satisfactorily substituted for the single radiant energy transmitting guide rod shown in Fig. 3 if it is desired to do so.

Experimentation has shown that the absorption characteristics and the index of refraction of a column of liquid and guide combination varies with the height of liquid-guide contact for certain predetermined wave lengths of radiant energy which are used that fall within the medium or weak absorption bands of this liquid. More specifically experimentation has shown that the amount of light transmitted by a radiant energy guide, such as the sapphire rod 34 from one end to the other not only depends on the index of refraction of the liquid 22 brought into physical contact with this radiant energy guide but also depends on the absorption characteristics of this liquid as is explained in detail in the previously referred to Vollmer et al. patent application, Serial No. 753,570. If the index of refraction of a fixed height of column of liquid 22 is low as compared with the index of refraction of the radiant energy guide and the aforementioned absorption losses are small, then a large portion of the light entering the guide at one end will pass through the guide and out the other end due to the fact that the critical angle of total reflection is very small and the loss due to the absorption characteristics of the liquid 22 is also small. With this arrangement practically all light impinging upon the peripheral side wall of the guide will be reflected back into the guide. If the index of refraction of the surrounding liquid is of a larger value than that noted supra so that the critical angle of total reflection is increased and the loss is due to the absorption characteristics of the medium is small then a smaller amount of light will pass out of the guide than was possible with the first mentioned arrangement.

Experimentation has further shown that the type of liquid 22 selected may possess strong absorption band characteristics which coincide with frequencies being emitted by the radiant energy source 12, 12a. Under this latter mentioned condition abnormally high non-linear losses due to the absorption characteristics of the liquid 22 will be present and an accurate measurement of the height of a column of this fluid can then only be acquired by eliminating these bands of radiant energy that are highly absorbed. The band regions of a fluid wherein this abnormally strong absorption of light takes place is known as the anomalous dispersion region. A description of how the presence of light energy at certain wave lengths is strongly absorbed in a non-linear manner by fluids with which they are brought into contact, in these anomalous dispersion regions, is disclosed in my copending application Serial No. 817,504, assigned to the same assignee.

To this end a source of radiant energy such as the light bulb 28 is positioned so that the energy it is emitting will pass through the filter 20 or 20a having a preselected band pass which will allow only the transmission of only those frequencies which are not absorbed in an abnormally high quantity by the type of liquid whose level is to be measured. The purpose of this filter is thus to permit only those frequencies of radiant energy which lie within the medium or weak absorption bands of the liquid 22 to pass through the rods 34, 28. The position of the light bulb 12 in the various figures of the drawing is such that it will cause equal amounts of light to fall upon the ends 26 and 32 of the sapphire rod 34 and 28 respectively after it has passed through either the filter 20, or 20a.

This arrangement will thus provide a light transmitting guide wherein the light that will be permitted to pass completely through and out of the guide will be dependent on the amount of the light that is transmitted by way of perfect internal reflection taken place within the guide, less the amount of the light that will be absorbed into the liquid by refraction due to its particular predetermined fixed index or refraction and/or its medium or weak absorption characteristics.

From the aforementioned description of the apparatus it will be noted that the present invention concerns itself with both a single or a double radiant energy transmitting guide arrangement which will provide an accurate and instantaneous way of converting either a liquid level or a pressure measurement into a variable electric signal that is proportional to such a measurement.

What is claimed is:

1. A fluid pressure to electrical signal converting apparatus, comprising a transmitting means within a tank through which a constant amount of light is transferred from a light source to an electrical light measuring means, a flexible means, a conduit connecting an internal portion of said flexible means with the inner lowermost portion of said tank, a liquid contained within said flexible means, a filter between said light source and said transmitting means to pass only those bands of light into said transmitting means that will be absorbed by said liquid only in small to medium quantities said conduit and said tank, said outer portion of said flexible means being operably arranged to have a fluid pressure of varying magnitude applied thereto and said flexible means being arranged to apply an increasing column of said fluid to an outer peripheral surface of said transmitting means as the magnitude of said fluid pressure is increase and to reduce the height of said column of liquid as the magnitude of said fluid pressure is decreased to thereby alter the energy that is lost from said transmitting means to said liquid due to the index of refraction and absorption characteristics of said liquid.

2. The converting apparatus specified in claim 1 wherein said flexible means is a bellows and said transmitter means is a sapphire rod that is positioned in a vertical direction in said tank.

3. An apparatus to continuously measure the height of a varying column of liquid within a tank, comprising an elongated light conducting member having first and second ends and a peripheral side wall, a light emitting means, a filter to absorb the wave lengths of said emitted light which lie in the anomalous dispersion region of said fluid, said light emitting means being positioned with respect to said filter to direct preselected bands of light at constant intensity through said filter and thence through and out of said member, means for retaining a column of said liquid in contact with a portion of said peripheral side wall of said member that is in an upright position and a means to indicate increases and decreases in the quantity of light passing out of said member due to changes which occur in the index of refraction and absorption characteristics of said liquid and said conducting member as said height of said column of liquid in said tank is altered from one level to another.

4. The liquid level measuring apparatus specified in claim 3 wherein said light conducting member is a sapphire rod and the filter for said light emitting means is comprised of a material having a preselected band pass through which only the transmission of those wave lengths of said emitted light which are not absorbed in an abnormally high quantity by said fluid can pass.

5. The liquid level apparatus as specified in claim 3 wherein said filtered light emitting means is comprised of a filter that is made of the same liquid as the liquid within said tank.

6. The liquid level measuring apparatus as specified in claim 3 wherein said filtered light emitting means is comprised of a filter that will pass only bands of light which have medium and weak absorption characteristics.

7. An apparatus to continuously and instantaneously measure the varying height of a column of fluid in terms of its light absorption characteristics and index of refraction, comprising a light source of constant intensity, a filter to absorb those wave lengths of light emitted by said light source which lie in the anomalous dispersion regions of said fluid, a light conducting guide being positioned to transmit the light that has passed through said filter into said guide, said light conducting guide having at least a portion thereof in physical contact with said column of fluid and a light energy measuring means positioned adjacent an opposite end of said guide and being responsive to the light which remains after said emitted light from said light source has passed by way of said filter into said one end of the guide, through said guide portion that is in contact with said fluid and has passed out of an opposite second end of said guide, thereby to provide a measure of said absorption characteristics and the index of refraction existing between said column of fluid and said guide.

8. An apparatus to measure the level of a fluid in a tank having an inlet and outlet and a valve means that is adjustably positioned to either introduce a fluid under pressure into the base of said tank or to drain said fluid from said tank, comprising a light transmitting means about an increasing peripheral portion of which said fluid that is introduced into said tank comes into contact when said valve is in one of said adjustable positions and about a decreasing peripheral portion of which said fluid is brought into contact with when said valve is in the other of said adjustable positions and said fluid is being drained from said tank, a light source of constant intensity, a filter to absorb those wave lengths of light emitted by said light source which lie in the anomalous dispersion regions of said fluid, said light source being operably positioned to transmit its light through said filter into, through and out of said transmitting means, and a meter positioned to measure said light exiting from said transmitting means in terms of changes which occur in the index of refraction and absorption characteristics of said fluid and said transmitting means as said peripheral portion of said fluid which is in contact with said transmitting means is increased or decreased.

9. The measuring apparatus specified in claim 8 wherein said transmitting means is a cylindrical elongated rod of sapphire material that possesses a higher index of refraction than said fluid.

10. An apparatus to continuously measure the height to which a fluid is caused to rise or fall in a tank, comprising a means to increase or decrease the flow of fluid into said tank, a light transmitting guide positioned in said tank and having a peripheral surface that is partially surrounded by said rising or falling fluid, a light source, a filter to absorb the wave lengths of light emitted by said light source which lie in the anomalous dispersion regions of said fluid, said light source being operably positioned to transmit its light through said filter into, through and out of said transmitting light guide, and a meter positioned to measure the light that exits from said guide as changes in the index of refraction and absorption characteristics of said fluid and said transmitting guide take place when said means causes said fluid to rise and fall in the tank.

11. An apparatus to measure the height of a column of fluid within a container in terms of its light absorption characteristics, comprising two identical elongated light conducting members, each having a first and second end portion, means to emit light, a filter to absorb those wave lengths of light emitted by said light emitting means which lie in the anomalous dispersion regions of said fluid, said light emitting means being operably positioned to transmit its light through said filter into said first end portions, through and out of the respective second end portions of said light conducting members, means to retain said fluid in physical contact with a peripheral portion of one of said members, radiant energy is passing, a radiant energy sensing means positioned to continuously and instantaneously sense the resulting light that has passed through each of said second end portions of said members and a null balancing instrument operably connected to said sensing means to thereby indicate the height of said fluid in terms of the ratio of the amount of light being sensed by said sensing means.

12. The measuring apparatus as specified in claim 11 wherein said second one of said members is positioned within said fluid and contains a non-refractive coating that is sensitive to changes occurring in the temperature of said fluid.

References Cited in the file of this patent
UNITED STATES PATENTS

| | | |
|---|---|---|
| 2,569,127 | Eltenton | Sept. 27, 1951 |
| 2,806,957 | McDonald | Sept. 17, 1957 |

UNITED STATES PATENT OFFICE

CERTIFICATE OF CORRECTION

Patent No. 2,984,148                                May 16, 1961

James Vollmer

It is hereby certified that error appears in the above numbered patent requiring correction and that the said Letters Patent should read as corrected below.

Column 6, line 50, after "means" insert -- said conduit and said tank --; line 54, after "quantities" insert a comma; same column 6, same line 54, strike out "said conduit and said tank,".

Signed and sealed this 13th day of November 1962.

(SEAL)
Attest:

ERNEST W. SWIDER                             DAVID L. LADD
Attesting Officer                                Commissioner of Patents